United States Patent
Zubarik (10) Patent No.: US 11,767,213 B2
(45) Date of Patent: Sep. 26, 2023

(54) AUTOMATED DISPENSING AND ASSEMBLY PROCESS FOR A FOOD ITEM

(71) Applicant: Server Products, Inc., Richfield, WI (US)

(72) Inventor: Kevin Zubarik, Jackson, WI (US)

(73) Assignee: Server Products, Inc., Richfield, WI (US)

( * ) Notice: Subject to any disclaimer, the term of this patent is extended or adjusted under 35 U.S.C. 154(b) by 41 days.

(21) Appl. No.: 17/388,887

(22) Filed: Jul. 29, 2021

(65) Prior Publication Data

US 2022/0033242 A1  Feb. 3, 2022

Related U.S. Application Data (60) Provisional application No. 63/057,983, filed on Jul. 29, 2020.

(51) Int. Cl.
*B67D 1/08* (2006.01)
*B67D 1/00* (2006.01)
(Continued)

(52) U.S. Cl.
CPC .......... *B67D 1/0888* (2013.01); *B65G 1/137* (2013.01); *B67D 1/0015* (2013.01); *G06F 9/547* (2013.01); *G06Q 20/20* (2013.01)

(58) Field of Classification Search
CPC .... B67D 1/0888; B67D 1/0015; B65G 1/137; G06F 9/547; G06Q 20/20; G06Q 10/06; G06Q 20/145; G06Q 20/18; G06Q 20/202; G06Q 30/0633; G06Q 50/12; G07F 9/023; G07F 13/06; G07F 13/065; G07F 13/10; G07F 17/0064
See application file for complete search history.

(56) References Cited

U.S. PATENT DOCUMENTS 7,617,850 B1    11/2009  Dorney
7,648,050 B1 *   1/2010  Ehlers ..................... G07F 13/02
                                              222/144.5
(Continued)

OTHER PUBLICATIONS

International Search Report and Written Opinion for corresponding International Application No. PCT/US2021/043719 dated Oct. 4, 2021.

*Primary Examiner* — Donnell A Long
(74) *Attorney, Agent, or Firm* — Quarles & Brady LLP (57) ABSTRACT

A system and method for guiding the assembly of a food or beverage item including a number of components is disclosed. The system includes a starting point device having a controller. The starting point device is operable to receive the details of the food item, which includes the components required to create the food or beverage item. The controller is in communication with multiple dispensers and bins that each include one or more of the components and an indicator. The controller activates the indicators associated with each of the components of the food or beverage item either sequentially or simultaneously to indicate to the staff member all of the components that need to be added to the food or beverage item. As each component is added, the indicator is deactivated until all of the components have been added. Once the food or beverage item is created, the controller indicates that the next food or beverage item can be created.

21 Claims, 4 Drawing Sheets

(51) Int. Cl.
*B65G 1/137* (2006.01)
*G06Q 20/20* (2012.01)
*G06F 9/54* (2006.01)

(56) References Cited

U.S. PATENT DOCUMENTS

| | | | | |
|---|---|---|---|---|
| 8,109,301 | B1* | 2/2012 | Denise | F25D 23/126 |
| | | | | 222/113 |
| 9,809,439 | B2 | 11/2017 | Falco, III | |
| 10,783,507 | B1 | 9/2020 | Votolato | |
| 2004/0167664 | A1* | 8/2004 | Griffin | G07F 9/026 |
| | | | | 700/237 |
| 2011/0173082 | A1* | 7/2011 | Breitenbach | G06Q 30/0277 |
| | | | | 705/16 |
| 2013/0314244 | A1* | 11/2013 | Hershberger | G01D 4/002 |
| | | | | 340/870.02 |
| 2015/0143393 | A1* | 5/2015 | Diachenko | H04N 21/41415 |
| | | | | 725/12 |
| 2016/0090288 | A1* | 3/2016 | Givens, Jr. | G07F 13/065 |
| | | | | 700/283 |
| 2016/0196711 | A1 | 7/2016 | Castellani | |
| 2017/0365017 | A1 | 12/2017 | Ells | |

* cited by examiner

AUTOMATED DISPENSING AND ASSEMBLY PROCESS FOR A FOOD ITEM

CROSS REFERENCE TO RELATED APPLICATIONS

The present application is based on and claims priority to U.S. Provisional Patent application Ser. No. 63/057,983, filed on Jul. 29, 2020, the disclosure of which is incorporated herein by reference.

BACKGROUND

The present disclosure generally relates to a process and the steps to assemble a food or beverage item in a restaurant or any other venue where food and/or beverages are served and consumed on premise or off premise. More specifically, the present disclosure relates to an automated process that aids in assembling food or beverage items utilizing automated dispensing devices and printed food item codes that identify the components on the food or beverage item and direct the process for assembling the food or beverage item.

Generally, when a customer enters an order at a restaurant or other venue that serves food or beverages, orders are placed through a point of sale (POS) system which may include a physical terminal. These POS systems record the customer order details that are then relayed to a kitchen, beverage preparation area or other food or drink area that could be located either on or off premise where the restaurant staff members assemble each of the food or beverage items based upon the customer order. In many establishments, the order details are displayed on a screen in areas where the food or beverage preparation occurs. An example would be in the back kitchen area or front service areas of most restaurants or food service facilities, regardless of type. When the restaurant staff member is assembling each of the food or beverage items, the staff member must be trained and is required to remember the available food or beverage inclusions and combinations of components for the food or beverage item in addition to the sequential order required for adding the components to the food or beverage item. The desired combination of components for the food or beverage item are selected by the customer at the time of ordering and can include the condiments (tomatoes, pickles, lettuce, ketchup, mustard, onions, etc.), toppings (syrups, flavoring, powders and other), and/or flavorings that are added to a base food or beverage item when a food or beverage item is being assembled. This requires the staff member to remember all of the condiments, toppings or flavorings needed on the food item while assembling each food or beverage item. If the customer order requires a plurality of food, drink or inclusion items, the staff member must remember a relatively large number of ingredients that are to be included or excluded on each of the food or beverage items.

In accordance with the present disclosure, an automated assembly and dispensing process has been developed that allows for a more automated method of selecting and dispensing components, such as condiments, toppings or flavorings, onto a food or beverage item as the food or beverage item is being assembled. The assembly and dispensing process and system of the present disclosure automates the food or beverage item assembly process, which reduces the amount of training needed for new employees. The process and system helps to automate the food or beverage item assembly process, which will increase the speed of assembly of the food or beverage item and will improves the accuracy of assembling the food or beverage item.

The system of the present disclosure utilizes an application programming interface (API) that allows the point of sale system or other system such as a mobile application platform, online ordering system of a restaurant or other food or beverage service facility to communicate with the food or beverage item assembly system of the present disclosure. The food or beverage item assembly system of the present disclosure operates independently from the point of sale system and thus can be used with point of sale systems from a large number of independent manufacturers.

SUMMARY

The present disclosure relates to a method and system for assembling food or beverage items at a restaurant or other venue where food and/or beverage items are served. The method and system allows for a more automated process of creating a food or beverage item utilizing multiple dispensers, packaging containers and food bins.

In one exemplary embodiment of the present disclosure, the system includes a starting point device that includes a controller and a sensor. The sensor is operable to read an order ticket that can include an order number or product identifier code. Once the system reads the order ticket, the controller determines the components that are required to create the food or beverage item. The controller operates to communicate with one or more food or beverage component dispensers and one or more bins or packaging systems that hold a food or beverage product if needed. The dispensers and the bins each include at least one indicator and may include a sensor to prevent user error by identifying the correct vessel prior to dispensing at each bin.

The controller guides the assembly of the food or beverage item by activating the indicator for each dispenser or bin that includes one of the components required for the food or beverage item. The indicators can be activated either sequentially or simultaneously to indicate to the staff member which components need to be added to the food or beverage item. Once a component is added to the food or beverage item, the indicator for that component is deactivated. This process continues until all of the components have been added to the food or beverage item. The system is thus able to automate the assembly process by directing the staff member to activate multiple dispensers to dispense the desired components, which increases the efficiency and effectiveness in creating the food or beverage item as compared to prior systems.

The present disclosure relates to automated food item assembly systems, where the process and steps to build a beverage or food item could be improved with a system to auto-identify the proper components/ingredients and/or order of operations when a food or beverage item is created.

The present disclosure includes a point of sale terminal, mobile device application software or online ordering platform that will generate an order number (could also be a QR code or bar code) through which the beverage or food item is tracked and/or labeled. The order number or code is selected or scanned at a starting point device to queue the food or beverage item to be built. Indicators at each component dispensing point will turn on to alert the staff member which ingredients/components (syrups, sauces, condiments, toppings, flavorings etc.) are to be dispensed or added to the food or beverage item. The staff member will position the food or beverage item at the first ingredient to be added and the desired portion of the ingredient will be dispensed either automatically (sensors) or after a dispense button is pressed. In one contemplated alternate embodiment, each dispensing point can include a sensor that is operable to directly read the QR or bar code of the order ticket or as printed onto a container for the food or beverage item. The dispensing of the component will be authorized only when the order ticket is presented to a dispensing point that includes a component that needs to be added to the food or beverage item. If the item order ticket is presented at the wrong dispenser, the dispenser will not be activated and will not dispense the incorrect or unwanted food or beverage component onto or into the food or beverage item. After the ingredient/component has been dispensed, the indicator will turn off until the next order number or code is queued. Once all of the ingredients have been added to the food or beverage item, an indicator will be activated to signal completion of the assembly process.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
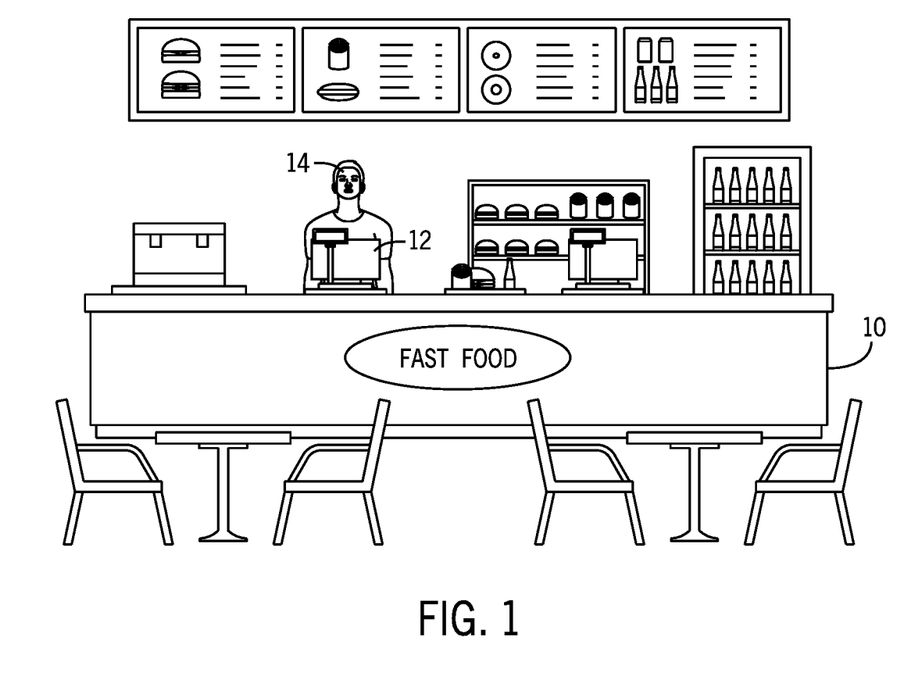
FIG. 1 is a view of a fast food restaurant ordering counter.
Figure 2:
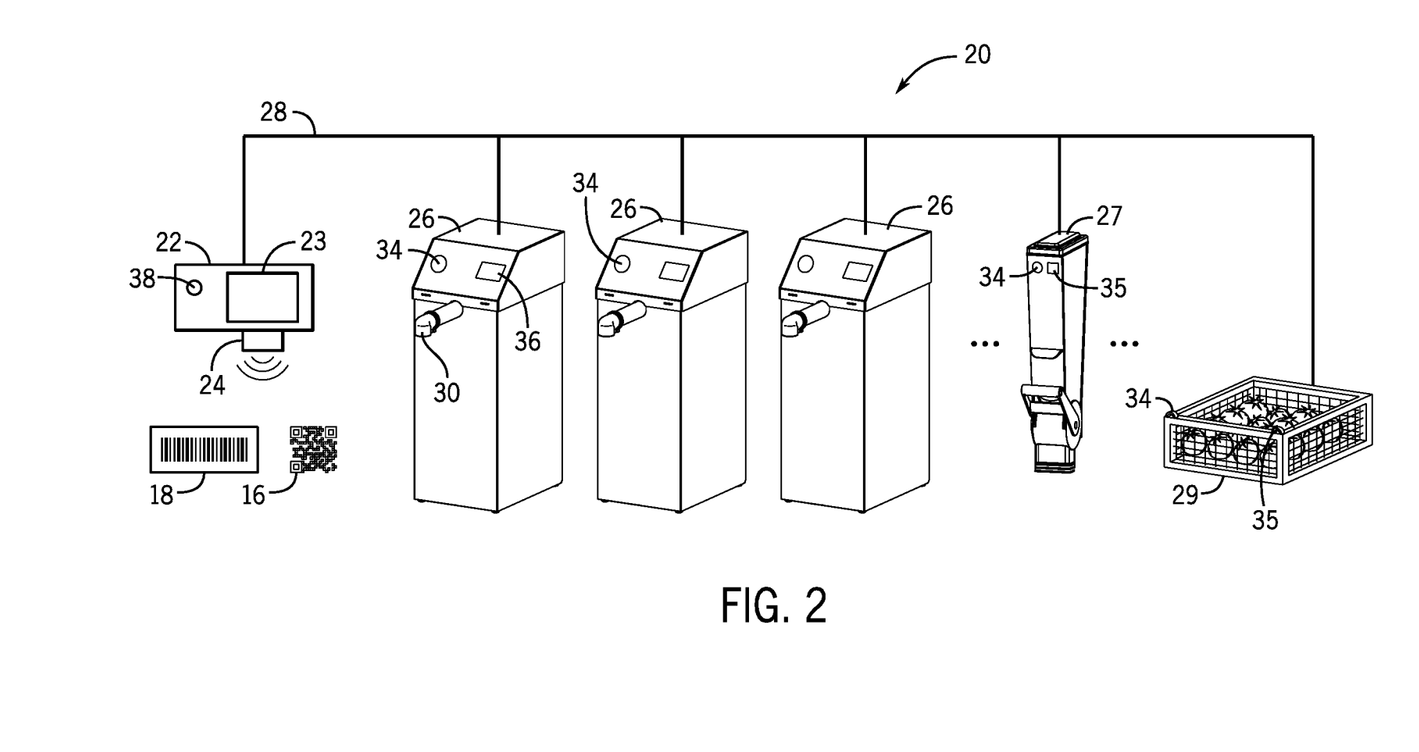
FIG. 2 is a schematic illustration of a plurality of dispensers and bins used to create a food or beverage item in accordance with the present disclosure.

FIG. 1 illustrates a standard restaurant ordering counter 10 that includes a point of sale (POS) ordering terminal 12. In the embodiment illustrated, an employee 14 receives an order from a customer and enters the order into the POS terminal 12. Although an employee 14 is shown in the embodiment of FIG. 1, it is contemplated that the POS terminal 12 could be an automated, unmanned terminal that allows the customer to enter an order from a touch screen, from a user-owned device, or an online ordering platform and subsequently pay for the order using any one of multiple payment procedures, such as a credit card, debit card, or cash. In each case, the point of sale (POS) terminal 12 will generate an order number or order ticket that is used to track the beverage and/or food items that are going to be custom created for the customer. The order number/ticket could be represented in a variety of ways, such as through a QR code 16 or a barcode 18, as shown in FIG. 2. The order number, QR code 16 or barcode 18 will include all of the details of the food items ordered by the customer at the POS terminal 12. The order number, QR code 16 or bar code 18 could be printed on an order ticket or directly on a container or cup for the food or beverage item being ordered.

In accordance with one embodiment of the present disclosure, the item code will be referred to as an order identifier that could be printed at the POS terminal, displayed on a display screen, shown on a portable device or printed in the kitchen/food preparation area of the fast food restaurant or other venue where food and beverages are served. The order identifier, such as the order number, QR code 16 or barcode 18 will be used to initiate the process of preparing and assembling the food or beverage item.

In the embodiment shown in FIG. 2, a food or beverage item assembly system 20 of the present disclosure is illustrated. The assembly system 20 shown in FIG. 2 is one exemplary embodiment of the system and is meant as an illustrative example only since other components and combinations of components are contemplated as being within the scope of the present disclosure.

The assembly system 20 includes a starting point device 22. The starting point device 22 is the control for the entire assembly system and is designed as being separately installed and manufactured from the POS terminal. The starting point device 22 is designed to include an application program interface (API) that will allow communication between the POS terminal and the starting point device 22. In this manner, the assembly system 20 can be used with POS terminals from a wide variety of manufacturers and does not need to be directly integrated with the POS terminals.

In the embodiment shown, the starting point device 22 includes a display screen 23 to show the order number and the items included in the order. The display screen 23 could be a touch screen that would allow the restaurant staff member to enter information into the starting point device or generally interact with the starting point device. In the embodiment shown, the starting point device 22 includes a sensor 24 that is able to electronically detect one of the item codes, such as the QR code 16 or the barcode 18. When the starting point sensor 22 detects one of the item codes, the starting point device 22 determines what components, such as but not limited to syrups, sauces, condiments, flavorings and/or toppings, need to be added to the food or beverage item. In one embodiment, the item code printed on the item order ticket would identify all of the components of the food or beverage item embedded directly into the item code such that no communication would be needed between the controller of the starting point device 22 and the POS terminal. Such configuration would completely separate the POS terminal 12 from the assembly system 20 and would eliminate any communication requirements between the two systems. In an alternate configuration, the assembly system 20 could communicate either wirelessly or through a wired connection with the POS terminal to obtain the list of the selected components.

As an example, if the food or beverage item is an ice cream food item, the POS terminal 12 generates a food item code that indicates what flavors, syrups, toppings or additional dry food products such as nuts or cookie pieces, need to be added to the ice cream food item. As indicated previously, this information is entered by the employee or by the customer directly through the POS terminal 12, a mobile device or an online ordering platform in a known manner.

In the embodiment shown in FIG. 2, the starting point device 22 is connected to a plurality of flowable product dispensers 26, dry product dispensers 27 and product bins 29 through a communication line 28. Although the embodiment shown in FIG. 2 illustrates that the communication line 28 is a hard-wired connection, it should be understood that the starting point device 22 could communicate to each of the dispensers 26 utilizing wireless communication, such as Bluetooth®.

In the embodiment illustrated in FIG. 2, each of the flowable product dispensers 26 includes a dispensing spout 30 and an internal pumping device (not shown). The internal pumping device can be activated to pump the flowable product out of the spout 30 and onto a product positioned beneath the spout 30. Each of the dispensers 26 includes an internal controller that controls the operation of the internal pump to dispense the desired amount of condiment from the spout 30. As an illustrative example, the flowable product dispenser 26 could be the Server Touchless Express dispenser available from Server Products, although other flowable product dispensers are contemplated. The flowable product dispenser 26 could include more than one type of flowable food products, such as the condiments barbeque sauce, mustard and ketchup. In addition, the flowable food product dispenser could dispense a wide variety of topping or flavorings that could be added to either food or beverage items. Such toppings could include syrups, milk, creams, hot toppings, cooled toppings, flavor additions or any other topping or flavoring that can be pumped. In such a dispenser, the dispenser controller would control not only the operation of the internal pump but also various valves to dispense the selected food product or topping from the multiple food product dispenser.

In the embodiment shown in FIG. 2, the front face 32 of the dispenser 26 includes at least one indicator 34 and an activation device 36. Although the activation device 36 is shown as a button on each of the dispensers 26, it should be understood that the activation device 36 could be removed and replaced with a sensor that is able to detect either the hand of a staff member in close proximity to the sensor or the presence of a food item or food or beverage vessel in the proper position for dispensing the condiment/component onto or into the food or beverage item being created. Such a sensor facilitates touch-free dispensing from the dispenser 26.

In an exemplary embodiment of the present disclosure, the indicator 34 is an LED that can be activated to provide a visual indicator to the staff member. However, although an LED indicator 34 is illustrated and discussed, it is contemplated that other visual indicators, such as a display screen, could be utilized to provide a visual indication to the staff member while operating within the scope of the present disclosure. The indicator 34 and/or the activation device 36 can be included directly in the food product dispenser 26 or could be an add-on indicator or activation device mounted to the dispenser 26. In this manner, existing dispensers 26 could be retrofit to include an indicator and/or activation device such that the system of the present disclosure could be used with dispensers 26 that are already in place in the restaurant or other venue that serves food or beverage items. Further, such add-on indicators or activation devices will allow the system of the present disclosure to work with dispensers from any manufacturer since the system does not need to directly communicate with the dispenser.

In the embodiment shown in FIG. 2, a second type of food product dispenser is shown. The second type of food product dispenser is a dry food product dispenser 27, which is designed to dispense dry toppings, such as nuts, crumbled cookies, crumbled candy bars or other similar dry food products into an ice cream treat. As an illustrative example, the dry food product dispenser 27 could be the SlimLine or CerealServ dispenser available from Server Products. The dry product dispenser 27 can includes a handle that allows the restaurant worker to dispense a known volume of topping onto or into the ice cream treat. The dry product dispenser 27 in the embodiment shown also includes an indicator 34 as well as a user engagement button 35 that allows a staff member to indicate the completion of a dispensing action. Once again, the indicator and/or the user engagement button 35 could either be built into the dry product dispenser 27 or could be an add-on indicator or button. Since the dry product dispenser 27 is manually activated by the staff member, the engagement button 35 allows the staff member to communicate back to the controller when the components included in the dispenser 27 has been added to the food item.

FIG. 2 illustrates a third type of food product dispenser as a bin 29. The bin 29 is designed to hold a specific type of component to be added to the food or beverage item ordered. As an example, the bin 29 could be used to hold lettuce, tomatoes, pickles, onions, nuts, candy pieces or other food or beverage toppings that could be included as a component of the food or beverage item ordered by the customer. A bin 29 is typically used to store components that cannot be dispensed directly onto the food or beverage item.

In the embodiment illustrated, the bin 29 also includes an indicator 34 and a user engagement button 35. The user engagement button 35 again allows the staff member to indicate when the component in the bin 29 is added to the food item during the assembly process to be described in more detail below. As indicated above, the indicator 34 and/or the user engagement button 35 could either be directly included as part of the bin 29 or could be an add-on device.

Figure 3:
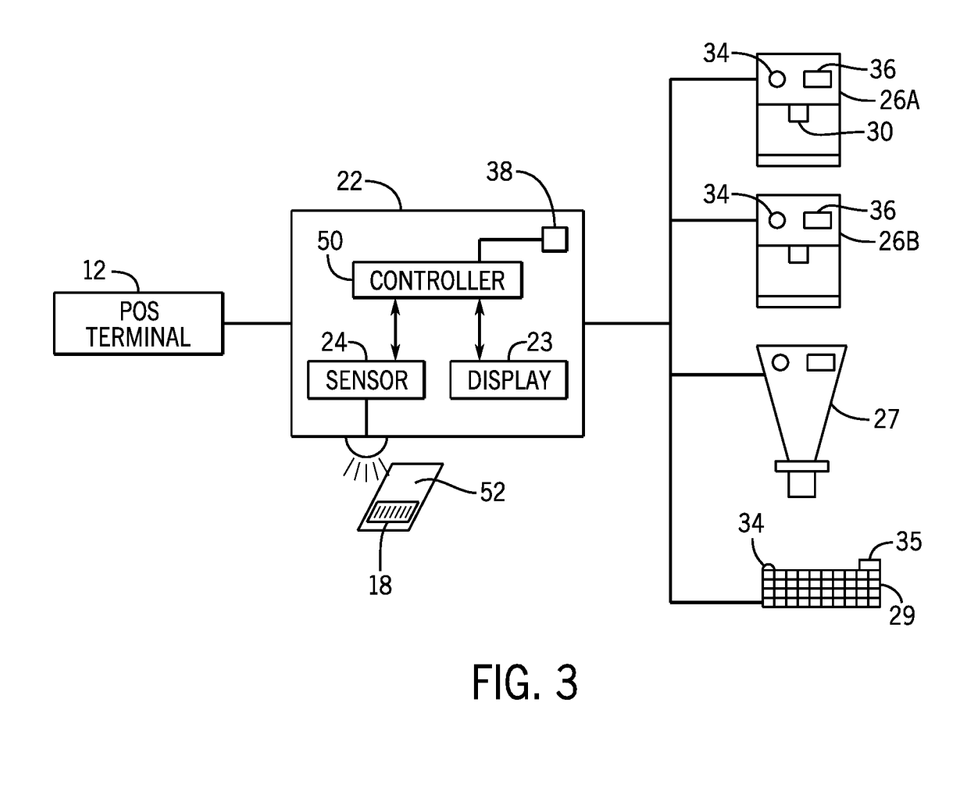
FIG. 3 is a schematic illustration of the controller and connected components for guiding the assembly of the food or beverage item.

Referring now to FIG. 3, the starting point device 22 is shown as including a controller 50 that is in communication with the sensor 24. The sensor 24 can be an optical sensor that is operable to detect and read one of the codes 18 on an item order ticket 52 associated with the food or beverage item ordered at the POS terminal 12, through a mobile device or an online ordering platform. In the embodiment shown, the POS terminal 12 is in communication with the starting point device 22. However, it is contemplated that the starting point device 22 could include an application program interface (API) and thus be completely independent from the POS terminal 12. In such an embodiment, the sensor 24 would read the item code 18 on the item order ticket 52. The API for the starting point device 22 would be included in the controller 50 such that the controller 50 can obtain information from the POS terminal 12 through the item code 18 on the item order ticket 52 without the need for any direct communication between the POS terminal 12 and the controller. Again, the API will allow the controller 50 of the starting point device to work with POS terminals from a wide variety of manufacturers.

The controller 50 within the starting point device 22 controls the automated process of guiding the staff member to assemble the food or beverage item specified by the item order ticket 52. In another embodiment, the starting point device 22 could include a touch screen 23 that displays all of the orders and food or beverage items that need to be assembled. The restaurant staff member could then touch the order to be fulfilled to begin the process.

As an illustrative example, if the food item is a hamburger, the starting point device 22 determines which condiments and toppings need to be added onto the hamburger, such as ketchup, mustard or relish. If the hamburger needs to include ketchup and the first dispenser 26a includes a supply of ketchup, the starting point device 22 activates the indicator 34 on the dispenser 26a. The staff member will then position the hamburger and bun beneath the spout for the ketchup dispenser 26a and either engage the dispense button 36 or position the food product beneath the spout 30 for automated sensing by the condiment dispenser 26.

Once the first condiment has been added to the food item, the controller 50 will turn off the indicator 34 and the indicator for the next condiment to be added to the food item will be illuminated. As an illustrative example, if the second dispenser 26b includes mustard, the indicator 34 will be illuminated and the staff member can place the food item beneath the second dispenser 26. Once the second component (mustard) has been added, the controller 50 will turn off the indicator 34 of the second dispenser 26b. In an example in which the hamburger includes tomatoes, the controller 50 will activate the indicator 34 of the bin 29 that is used to hold tomatoes. Once the staff member adds a tomato to the hamburger, the staff member touches the button 35 to indicate that the tomato has been added. The controller 50 will then turn off the indicator 34. This process continues until all of the components, including condiments and toppings, have been added to the food item. Once the food item has been created, an indicator 38 on the starting point device 22 can be illuminated to indicate that the food item has been completed and that the next order number or code can be read and the next food item created.

Although the illustrative example was given for the preparation of a food item such as a hamburger, it should be understood that various beverages, such as a shake, smoothie, coffee-based drink or ice cream desserts could be created utilizing the same method. For example, if a sundae is to be built with hot fudge, caramel, fruit toppings and dry toppings, each of the dispensers 26 and 27 would be sequentially illuminated to guide the staff member through the process of creating the ice cream based food item.

If the assembly sequence for the food or beverage item is important for the proper creation of the food or beverage item, the controller 50 can sequentially activate the indicators 34 for the components such that the components are added in a desired order. Alternatively, if the sequence of adding the components to the food or beverage product is not important, all of the indicators could be simultaneously activated and the staff member can then add the components in the order that reduces movement or is the easiest to complete.

Figure 4:
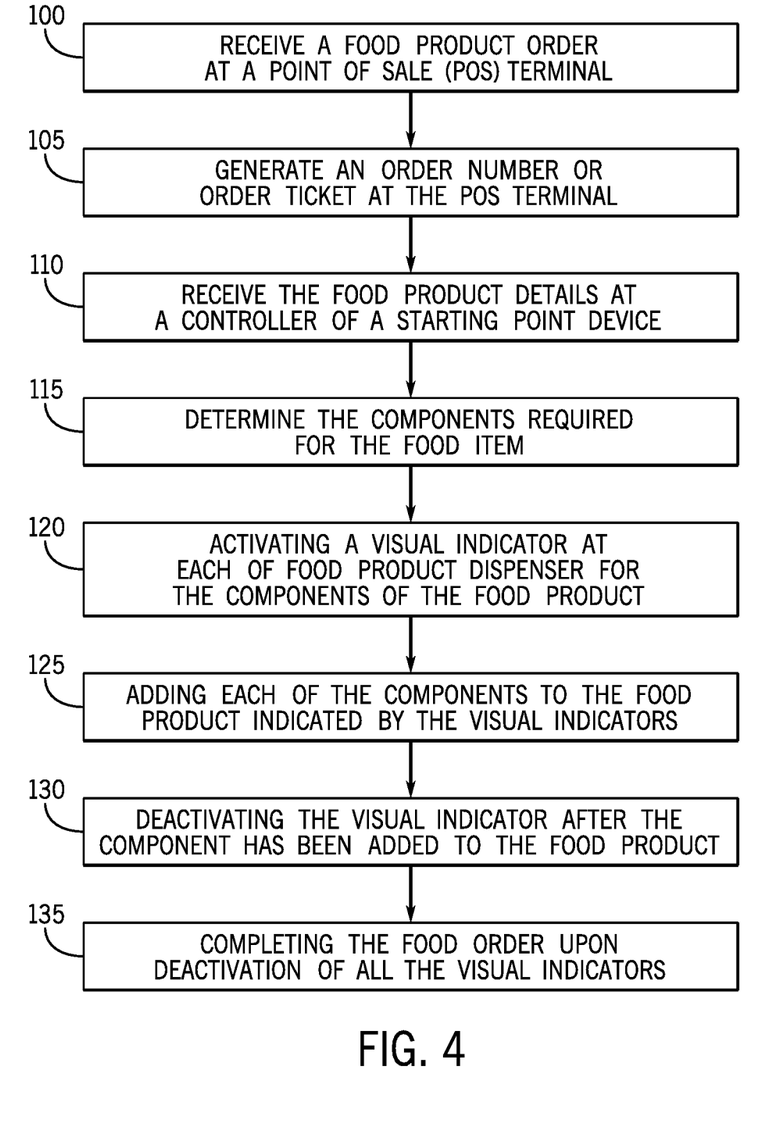
FIG. 4 is a flow chart illustrating the food or beverage item assembly method and process of the present disclosure.

FIG. 4 is a flow chart generally illustrating the steps carried out in accordance with the method of the present disclosure. The method of the present disclosure utilizes the items shown and described previously in FIGS. 1-3.

Initially, in step 100, the employee at the POS terminal 12 receives an order from a customer and enters the order into the POS terminal. Typically, the order allows the customer to customize each food or beverage item being ordered. Alternatively, the customer can enter the order directly at the POS terminal 12 through a touch screen or other user input device without the need for an employee. As another contemplated embodiment, the customer could enter the order through a personal device, such as a smart phone, or an online ordering platform and the order would be received by the restaurant and an order ticket printed at the POS terminal 12.

Once the complete customer order has been entered or received, the POS terminal 12 generates either an order number or a code in step 105. The order number or code could be the QR code 16 or barcode 18 shown in FIG. 2. If an order number is created, the order number can be displayed on a display terminal in the food preparation area. When the staff member is ready to assembly the food item, the staff member would then select the order number to begin the assembly process. In an embodiment in which a item ticket with a code is generated, the code is printed as a separate ticket or on a container for the food or beverage item and the code can then be scanned by the food staff member at the starting point device 22 when the staff member is ready to create the food or beverage items on the order.

The starting point device 22 includes a controller that is able to access the order information either from the POS terminal 12 or directly from an internal memory at the starting point device based on the item code as shown in step 110. As indicated in step 115, the controller of the starting point device 22 is then able to determine what components are required to create the food or beverage item, such as the desired condiments, toppings, flavorings and/or ingredients need to be added to the food or beverage item. Once the controller 50 within the starting point device 22 makes this determination, the controller 50 of the starting point device 22 sequentially illuminates indicators on each of the dispensers and bins to guide the staff member through the process of creating the food or beverage item, as indicated by step 120. In an alternate embodiment, if the order of assembly is not important, all of the indicators for the components to be added could be illuminated at once to simultaneously indicate all of the components that need to be added to the food or beverage item.

In a contemplated alternate embodiment, each of the dispensers 26 and 27 could include a sensor that is able to scan the item code on the item order ticket 52 at the dispenser itself. In such an embodiment, the staff member would present the item order ticket 52 to the sensor on the individual dispenser 26. If the item order ticket 52 calls for the component/ingredient that is within the dispenser, the dispenser would be activated to dispense the food or beverage component. However, if the staff member presents the item order ticket 52 to a dispenser that includes a component that is not to be added to the food or beverage item, the dispenser would be disabled and the component would not be dispensed.

In the contemplated alternate embodiment in which each dispenser includes a sensor, the system would be able to prevent the incorrect assembly of the food pr beverage item by allowing only the dispensing of the proper, ordered components onto the food or beverage item. The staff member could still be guided to the proper dispensers by the indicator and would then scan in the item order ticket 52. The dispenser would then dispense the proper quantity and type of condiment/component onto or into the food or beverage item. In such an embodiment, if the dispenser included several different condiments or components, the dispenser would dispense each of the condiments or components called for on the order ticket based on the scanned information received from the order ticket 52.

Preferably, each of the dispensers 26 is programmed such that a desired amount of the component is dispensed onto the food item. In some embodiments, when the customer enters the order, the customer can indicate either an increased amount of a condiment, flavoring or topping or a decreased amount of condiment, flavoring or topping to be added to the food or beverage item. This information would then be relayed to each of the dispensers 26 such that the customer selected amount of condiment, flavoring or topping can be added to the food or beverage item.

After the correct portion of the component is dispensed onto the food or beverage item in step 125, the method proceeds to step 130 in which information about the addition of the component is communicated back to the controller 50 and the controller can de-activate the indicator for the dispenser or bin. Once the component has been added, the controller moves on to the next components and the indicator for the next component is activated.

After the food or beverage item has been created, all of the indicators on the dispensers and bins will be turned off as indicated in step 135. At this time, an indicator 38 on the starting point device 22 is illuminated indicating that the food or beverage item has been properly created. Once properly created, the food or beverage item can be packaged and the staff member move onto the next food or beverage item, which is again indicated by a code or order number.

As can be understood by the above disclosure, the method and system of the present disclosure allows for a more automated process of assembling or creating a food or beverage item utilizing multiple dispensers and bins. The use of a starting point device to scan an order number or product code from a separate POS terminal and then guiding the assembly of the food or beverage item utilizing the multiple dispensers increases the efficiency and effectiveness in creating the food or beverage item as compared to prior systems.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for directing the assembly of a food or beverage item ordered by a consumer and specified on an order ticket generated by a point of sale terminal, the food or beverage item including a plurality of components, comprising:
    a starting point device including a controller and a sensor operable to read the order ticket, wherein the controller is configured to identify a combination of the plurality of components for the food or beverage item based on the order ticket; and
    a plurality of pump driven flowable food product dispensers each including an internal storage area for at least one of the plurality of components and an indicator integrated into the flowable food product dispenser, wherein the dispensers are each operable to dispense the component from the internal storage area,
    wherein the controller is configured to activate the indicator for each of the plurality of dispensers for the combination of the plurality of component.

2. The system of claim 1 further comprising one or more bins for holding at least one of the plurality of components, each bin including an indicator.

3. The system of claim 1 wherein each of the plurality of dispensers is operable to dispense a specified volume of the component.

4. The system of claim 3 wherein the indicator on the dispenser is deactivated after dispensing.

5. The system of claim 1 wherein one or more of the dispensers include more than one of the plurality of components.

6. The system of claim 1 wherein the controller include an application programming interface (API) that provides a connection between the controller and the point of sale terminal.

7. The system of claim 1 wherein each of the plurality of dispensers includes an activation device such that upon activation of the activation device, the dispenser dispenses a known amount of the component.

8. The system of claim 1 wherein at least one of the dispensers includes a sensor operable to read the order ticket such that the dispenser is activated only when the component included in the dispenser is specified in the order ticket.

9. A method of assembling a food or beverage item including a plurality of components ordered by a customer, comprising the steps of:
    receiving details of the food item at a controller;
    determining the plurality of components required for the food or beverage item in the controller;
    operating the controller activate an indicator associated with a dispenser for each of the plurality of components, wherein the dispensers is a pump driven flowable food product dispenser operable to dispense at least one flowable food product and the indicator is integrated into the dispenser;
    adding each of the components to the food or beverage item as indicated by the activated indicator;
    deactivating the indicator after the component has been added to the food or beverage item; and
    completing the food or beverage product once all of the indicators have been deactivated.

10. The method of claim 9 wherein the details of the food item are printed on an order ticket and the details of the food or beverage item are determined by reading the order ticket.

11. The method of claim 10 wherein the order ticket is read by a sensor in communication with the controller.

12. The method of claim 9 wherein the flowable food product dispenser includes an activation device such that the flowable food product dispenser dispenses a specified volume of the flowable food product upon of the activation of the activation device.

13. The method of claim 12 wherein the indicator is deactivated after dispensing of the specified volume of the flowable food product.

14. The method of claim 9 wherein the controller sequentially activates the indicators to control the order the components are added to the food or beverage item.

15. The method of claim 9 wherein the controller simultaneously actives the indicators for all of the components to be added to the food or beverage item.

16. The method of claim 9 wherein the controller includes an application programming interface (API) that provides a connection between the controller and the point of sale terminal such that the controller can determine the plurality of components for the food or beverage item.

17. A system for directing the assembly of a food or beverage item ordered by a consumer, the food item including a plurality of components, comprising:
    a starting point device including a controller; and
    a plurality of pump driven flowable food product dispensers each including an internal storage area for at least one of the plurality of components and an indicator integrated into the dispenser,
    wherein the controller is configured to:
    receive details of the food or beverage item;
    determine the plurality of components required for the food or beverage item;
    communicate to the plurality of dispensers such that the indicator integrated into each of the dispenser for the plurality of components is activated;
    deactivate the indicator after the component has been added to the food or beverage item; and
    indicate completion of the food or beverage item once all of the indicators have been deactivated.

18. The system of claim 17 wherein the starting point device includes a sensor operable to read an order ticket from the point of sale terminal.

19. The system of claim 17 wherein at least one of the plurality of dispensers includes an activation device such that upon activation of the activation device, the dispenser automatically dispenses a known amount of the component.

20. The system of claim 17 wherein the controller includes an application programming interface (API) that provides a connection between the controller and the point of sale terminal such that the controller can determine the plurality of components for the food or beverage item.

21. The system of claim 17 wherein at least one of the dispensers includes a sensor operable to read an order ticket from the point of sale terminal such that the dispenser is activated only when the component included in the dispenser is specified in the order ticket.

* * * * *